United States Patent [19]

Adachi et al.

[11] Patent Number: 5,356,954
[45] Date of Patent: Oct. 18, 1994

[54] METHOD FOR PREPARING AN ELECTRICALLY CONDUCTIVE ORGANOSILOXANE COMPOSITION

[75] Inventors: Hiroshi Adachi, Chiba; Noriyuki Suganuma, Fukui, both of Japan

[73] Assignee: Dow Corning Toray Silicone Co., Ltd., Tokyo, Japan

[21] Appl. No.: 21,932

[22] Filed: Feb. 25, 1993

[30] Foreign Application Priority Data

Feb. 28, 1992 [JP] Japan .................. 4-079048

[51] Int. Cl.$^5$ .............................. C08K 9/00
[52] U.S. Cl. .................. 523/200; 252/511; 524/588; 524/432; 524/430; 524/863; 524/783; 524/779
[58] Field of Search .......... 252/511; 523/200; 524/588, 432, 430, 863, 783, 779

[56] References Cited

U.S. PATENT DOCUMENTS 5,015,413 5/1991 Nagaoka .............. 252/511

FOREIGN PATENT DOCUMENTS 1-287169 11/1989 Japan.
2216894 10/1989 United Kingdom.

OTHER PUBLICATIONS

Documentation Abstracts Journal, week 8842 (Dec. 14, 1988) AN-88296003 and JP-A-63 215 745.

Primary Examiner—Melvyn I. Marquis
Assistant Examiner—Karen A. Dean
Attorney, Agent, or Firm—Robert Spector

[57] ABSTRACT

The electrical conductivity of room temperature curable compositions containing at one polyorganosiloxane, a curing agent and certain light colored electrically conductive fillers is increased while maintaining the viscosity at desirably low levels and not adversely affecting the physical properties of the cured composition when the curable polyorganosiloxane is blended with the curing agent prior to addition of the filler.

3 Claims, No Drawings

METHOD FOR PREPARING AN ELECTRICALLY CONDUCTIVE ORGANOSILOXANE COMPOSITION

BACKGROUND OF THE INVENTION

1. Field of the Invention

This invention relates to a method for preparing electrically conductive polyorganosiloxane compositions. More particularly, this invention relates to a method for increasing the electrical conductivity of moisture curable organosiloxane compositions containing light-colored electrically conductive fillers without adversely affecting the properties of the cured compositions. This is achieved by defining the order in which the ingredients, particularly the curable polyorganosiloxane, filler and curing agent are blended with one another.

2. Background Information

Clean rooms are used in the manufacture of electronic devices and in the fabrication of the semiconductors devices, including integrated circuits, that are the heart of such devices. The purpose of a clean room is to prevent dust adhesion and discharge failure due to static electricity. Materials resistant to the accumulation of static electrical charges are used for the walls and floors of clean rooms, and electrically conductive silicone sealants are used for their joints and seams.

Prior art electrically conductive silicone sealants typically consist of room-temperature-curable organosiloxane compositions containing fillers such as carbon black and silver powder to provide the required electrical conductivity. These fillers impart a black or other dark color to the composition, which contrasts with the white or light colors of the wall materials used in clean rooms and makes these rooms less aesthetically attractive.

Room temperature curable organosiloxane compositions containing white or lightly colored electrically conductive fillers such as titanium oxide whose surface has been treated with a blend of antimony and tin oxides are known, however this type of organosiloxane composition does not exhibit a stable or consistent conductivity. More specifically, a drawback to this type of composition is that it does not develop a satisfactory conductivity unless the conductive filler is added in large quantities. This causes a high viscosity with the associated poor workability.

Japanese Laid Open Patent Application Number 1-287169 [287,169/1989] teaches imparting a stable conductivity to room temperature curable organosiloxane compositions containing light colored electrically conductive fillers by diluting the compositions with an organic solvent. While the solvent reduces the viscosity of the curable composition and improves the dispersibility of the conductive filler, the composition undergoes volumetric shrinkage upon curing. As a consequence, when such a composition is used in the joints and seams of wall or floor material, its performance is unsatisfactory because it has a poor sealing performance.

One objective of the present invention is to provide a method for preparing conductive organosiloxane compositions containing relative high concentrations of light-colored electrically conductive fillers that have excellent workability in the uncured form and cure to yield elastomeric products with excellent electrical conductivity and physical properties.

SUMMARY OF THE INVENTION

As a result of extensive research directed at solving the problems associated with prior art room temperature curable organosiloxane compositions containing light colored electrically conductive fillers, the present inventors found that the conductivity of the cured composition is substantially increased without adversely affecting the physical properties of the cured composition when the curable composition is prepared by first blending a curable polyorganosiloxane and a crosslinker to homogeneity and then blending a specific type of light colored electrically conductive filler into the resulting mixture. The present invention is based on this discovery.

DETAILED DESCRIPTION OF THE INVENTION

This invention provides a method for preparing an electrically conductive organosiloxane composition, said method comprising the steps of
1) first blending to homogeneity
   (A) 100 weight parts of a polyorganosiloxane containing silicon-bonded organic groups and at least 2 silicon-bonded hydroxyl groups or hydrolyzable groups in each molecule and exhibiting a viscosity of 20 to 1,000,000 centistokes at 25° C. with
   (B) 1 to 50 weight parts of a silane containing at least 3 silicon-bonded hydrolyzable groups in each molecule or a partial hydrolysis/condensation product of said silane,
2) and then blending the resultant mixture with
   (C) 5 to 800 weight parts of a particulate light colored filler selected from the group consisting of metal oxides and titanates, wherein the particles of said filler are coated with an electrically conductive material.

The polyorganosiloxane, identified as ingredient A of the present method is the main or basic ingredient of the moisture curable organosiloxane composition. This ingredient must contain at least 2 hydroxyl or hydrolyzable groups in each molecule. Suitable hydrolyzable groups include but are not limited to alkoxy groups such as methoxy, ethoxy, propoxy and butoxy; oxime groups such as the methyl ethyl ketoxime group; acyloxy groups; amide groups; and aminoxy groups. Ingredient A has a viscosity at 25° C. in the range of from 20 to 1,000,000 centistokes.

Only a meager rubbery elasticity will be obtained after curing when ingredient A has a viscosity below this range, while the workability of the curable composition declines at higher viscosities. The preferred viscosity range for ingredient A is from 100 to 100,000 centistokes at 25° C.

The organic groups in ingredient A include but are not limited to alkyl radicals such as methyl, ethyl, propyl, and butyl; alkenyl radicals such as vinyl, allyl, and hexenyl; aryl radicals such as phenyl and tolyl; and substituted alkyl radicals such as 3,3,3-trifluoropropyl, 3-chloropropyl, and 3-cyanoalkyl.

Specific polyorganosiloxanes suitable for use as ingredient A include but are not limited to silanol (SiOH) terminated polydimethylsiloxanes, methylphenylhydroxysiloxy-terminated polydimethylsiloxanes, methyldimethoxysiloxy-terminated polydimethylsiloxanes, and vinyldimethoxysiloxy-terminated polydimethylsiloxanes.

Ingredient B of the compositions prepared in accordance with the present method is a silane or siloxane containing at least 3 silicon-bonded hydrolyzable groups in each molecule. Based on the crosslinking that occurs by the reaction of this ingredient with the silanol or hydrolyzable groups of ingredient A, ingredient B brings about curing of the present composition to yield a rubbery elastic material. In addition, ingredient B provides a stable electrical conductivity to the cured composition by treating the surfaces of the conductive filler, referred to as ingredient C, thereby improving contact between the filler particles.

Ingredient B includes silanes of the general formula $$R_aSiX_{4-a}$$

and polyorganosiloxanes resulting from partial hydrolysis/condensation of these silanes. In this general formula R represents a monovalent hydrocarbon radical that includes but is not limited to alkyl such as methyl, ethyl and propyl, and alkenyl such as such as vinyl and allyl.

X represents a hydrolyzable group that includes but is not limited to the methyl ethyl ketoxime group, acyloxy groups, amide groups, and aminoxy groups.

Ingredient B should be present at a concentration equivalent 1 to 50 weight parts per 100 weight parts of ingredient A. Gelation of the curable composition will occur during storage at less than 1 weight part; while at concentrations greater than 50 weight parts curing of the composition is retarded and its sealing performance deteriorates due to an increasing volumetric shrinkage.

Ingredient C of the compositions prepared in accordance with the present method is a lightly colored electrically conductive metal oxide filler. This ingredient provides both electrical conductivity and a light color tone. Suitable light colored electrically conductive fillers include but are not limited to titanium oxide powder whose surface has been treated with tin and/or antimony, potassium titanate powder whose surface has been treated with tin and/or antimony, tin oxide whose surface has been treated with antimony, and zinc oxide whose surface has been treated with aluminum. The morphology of this component may be spherical, acicular, or amorphous.

Ingredient C is preferably added at a concentration of from 5 to 800 weight parts per 100 weight parts of ingredient A. A stable electrical conductivity essentially cannot be obtained at concentrations below 5 weight parts, while the cured rubbery elastic material suffers from a decline in flexibility when the concentration exceeds 850 weight parts.

The preparative method of the present invention requires that ingredients A and B are mixed together first to form a homogeneous blend. Ingredient C is then blended into the resultant mixture.

If ingredient C is added prior to formation of a blend of ingredients A and B, the electrical conductivity of the final cured composition will be substantially reduced.

Although the preparative method of the present invention comprises adding ingredient C to a preformed mixture of ingredients A and B as described in the preceding sections of this specification, a curing catalyst, referred to as ingredient D, can be added on an optional basis. The curing catalyst accelerates curing of the composition. Suitable catalysts include but are not limited to carboxylates of tin, titanium, zirconium, iron, antimony, bismuth, and manganese and by organotitanate esters and chelated organotitanium compounds. Specific examples of curing catalyst are tin compounds such as dibutyltin dilaurate, dibutyltin dioctoate, dioctyltin dilaurate, dibutyltin malate ester, and stannous octoate, and titanium compounds such as tetrabutyl titanate, diisopropoxybis(acetylacetone) titanium, and diisopropoxybis(ethyl acetoacetate)titanium.

Ingredient D is typically added at no more than 10 weight parts per 100 weight parts of ingredient A. Concentrations above 10 weight parts cause problems such as an excessively short cure time and a decline in the rubbery elasticity and heat resistance of the cured product. Ingredient D can be added either during blending of ingredients A and B or after ingredients A, B and C have been blended.

In addition to ingredients A, B, C and D, various types of additives may also be employed in the preparative method of the present invention so long as the objectives of this invention are not compromised. These additives include but are not limited to adhesion promoters such as aminosilanes, fillers such as silica and calcium carbonate, plasticizers, and heat stabilizers.

The following examples describe preferred embodiments of the present method, and should not be interpreted as limiting the scope of the invention defined in the accompanying claims. In the examples all parts are by weight, viscosity values were obtained at 25° C., and cs represents centistokes (1 centistoke=$1 \times 10^{-3}$ mm/sec)

EXAMPLE 1

10.0 parts of methyltris(methyl ethyl ketoxime)silane were blended to homogeneity into 100 parts of a silanol-terminated polydimethylsiloxane with a viscosity of 4,000 cs. To the resultant mixture were added 30 parts of potassium titanate whiskers whose surface had been treated with tin and antimony, and the resultant mixture was blended to homogeneity. The whiskers were identified as WK-200, a product of Otsuka Kagaku Kabushiki Kaisha. 1.3 parts of gamma-(2-aminoethyl)aminopropyltrimethoxysilane and 0.2 parts dibutyltin dilaurate were added to the resulting mixture, which was then blended to homogeneity to produce a one part electrically conductive curable organosiloxane composition in accordance with the present method. This composition was formed into a 3 mm-thick sheet and cured in this form for 3 days at room temperature. The volume resistivity and elastomeric properties of the resulting silicone rubber sheet were measured, and the results are reported in Table 1.

Comparison Example 1

This example demonstrates the criticality of the order in which ingredients B and C are added to ingredient A.

120 parts of the same potassium titanate whiskers used in the composition of example 1 were added with mixing to homogeneity to 100 parts of the same silanol-terminated polydimethylsiloxane described in example 1. To the resulting mixture was added 14.3 parts of methyltris(methyl ethyl ketoxime)silane, 1.8 parts gamma-(2-aminoethyl) aminopropyl trimethoxysilane, and 0.2 parts dibutyltin dilaurate. Blending of the resultant mixture to homogeneity yielded an electrically conductive organosiloxane composition that was not prepared in accordance with the present method. This composition was tested as described in Example 1, and these results are reported in Table 1. The extrudability of this composition was substantially poorer than that of the conductive organosiloxane composition prepared as described in Example 1.

Comparison Example 2

This example demonstrates that the addition of a diluent will not correct the deficiencies resulting from an improper order of addition of ingredients B and C to ingredient A.

120 parts of the same potassium titanate whiskers described in example 1 were added with blending to homogeneity to 100 parts of the silanol-terminated polydimethylsiloxane described in example 1. 20 parts xylene were added to this mixture as an organic diluent and the mixture was blended to homogeneity. To the resulting mixture was added 14.3 parts of methyltris(methyl ethyl ketoxime)silane, 1.8 parts gamma-(2-aminoethyl)aminopropyltrimethoxysilane, and 0.2 parts dibutyltin dilaurate. Blending of the resultant mixture to homogeneity yielded a conductive organosiloxane composition outside the scope of the present method. This composition was tested as described in Example 1, and these results are reported in Table 1 below.

Because this composition contained organic solvent, it had a substantially larger volumetric shrinkage than the conductive organosiloxane composition prepared as described in Example 1.

EXAMPLE 2

20 parts of methyltris(methyl ethyl ketoximo)silane were added to 100 parts of the same silanol-terminated polydimethylsiloxane described in example 1. This mixture was then added with blending to homogeneity to 80 parts of a titanium oxide with an average particle diameter of 0.2 micrometers that had been surface treated with tin and antimony. To the resultant mixture were added 2.5 parts gamma-(2-aminoethyl)aminopropyl-trimethoxysilane and 0.3 parts of dibutyltin dilaurate. Blending the resultant mixture to homogeneity yielded a conductive polyorganosiloxane composition prepared in accordance with the present method. This composition was tested as in Example 1, and these results are reported in Table 1.

EXAMPLE 3

25 parts of methyltris(methyl ethyl ketoximo)silane were blended to homogeneity into 100 parts of the same silanol-terminated polydimethylsiloxane described in example 1, followed by addition with blending to homogeneity of 140 parts of zinc oxide exhibiting an average particle diameter of 1.6 micrometers that had been surface treated with aluminum powder. To the resultant mixture were added 2.5 part of gamma-(2-aminoethyl)aminopropyltrimethoxysilane and 0.3 parts of dibutyltin dilaurate. Blending of this mixture to homogeneity yielded a conductive organosiloxane composition prepared in accordance with the present method. This composition was tested as described in Example 1, and these results are reported below in Table 1.

EXAMPLE 4

5 parts methyltriacetoxysilane and 5 parts ethyltriacetoxysilane were added to 100 parts of a silanol-terminated polydimethylsiloxane with a viscosity of 15,000 cs and the resultant mixture was blended to homogeneity. To this blend were added 30 parts of the potassium titanate whiskers described in example 1 with blending to homogeneity. 0.1 part of dibutyltin diacetate was then added and the mixture blended to homogeneity to yield an electrically conductive curable organosiloxane composition prepared in accordance with the present method. This composition was tested as described in Example 1, and the results are reported in Table 1.

EXAMPLE 5

10 parts of dimethylbis(N-methylacetamido)silane and 2 parts of an aminoxysilane with the formula $(CH_3)_3SiO[(CH_3)_2SiO]_2[(C_2H_5)_2NOSi(CH_3)O]_5$-$Si(CH_3)_3$ were blended to homogeneity into 100 parts of the silanol-terminated polydimethylsiloxane described in example 1. To the resultant mixture were added 30 parts of the potassium titanate whiskers described in example 1 with blending to homogeneity. The resulting curable composition prepared in accordance with the present method was tested as described in Example 1, and the results are reported in Table 1.

TABLE 1

| | volume resistivity (ohm-cm) | Elastomer Hardness (JIS A*) | Properties Tensile Strength (kg/cm$^2$) | Tensile Elongation % |
|---|---|---|---|---|
| Example 1 | 3 × 10$^3$ | 49 | 32 | 170 |
| Comparison Example 1 | 1 × 10$^{13}$ | 57 | 45 | 60 |
| Comparison Example 2 | 6 × 10$^6$ | 58 | 45 | 60 |
| Example 2 | 4 × 10$^3$ | 56 | 35 | 100 |
| Example 3 | 4 × 10$^6$ | 54 | 43 | 110 |
| Example 4 | 9 × 10$^4$ | 43 | 23 | 190 |
| Example 5 | 9 × 10$^4$ | 12 | 8 | 300 |

* = Japan Industrial Standards A scale

That which is claimed is:

1. A method for preparing an electrically conductive organosiloxane composition, said method comprising the steps of
    1) first blending to homogeneity
        (A) 100 weight parts polyorganosiloxane containing silicon-bonded organic groups and at least 2 silicon-bonded hydroxyl groups or hydrolyzable groups in each molecule and exhibiting a viscosity of 20 to 1,000,000 centistokes at 25° C. with
        (B) 1 to 50 weight parts of a silane containing at least 3 silicon-bonded hydrolyzable groups in each molecule or a partial hydrolysis/condensation product of said silane,
    2) and then blending the resultant mixture with
        (C) 5 to 800 weight parts of a particulate light colored filler selected from the group consisting of metal oxides and titanates, wherein the particles of said filler are coated with an electrically conductive material.

2. A method according to claim 1 wherein the organic groups present on said polyorganosiloxane are monovalent hydrocarbon radicals, the viscosity of said polyorganosiloxane is from 100 to 1,000 centistokes, said filler is selected from the group consisting of titanium oxide, potassium oxide, tin oxide and zinc oxide, said electrically conductive material is selected from the group consisting of tin, antimony, mixtures of tin and antimony, and aluminum, the concentration of said filler is from 10 to 500 weight parts, said silane is represented by the general formula $$R_aSiX_{4-a}$$

where R represents a monovalent hydrocarbon radical selected from the group consisting of methyl, ethyl, propyl, vinyl and allyl, and X represents a hydrolyzable group selected from the group consisting of methyl ethyl ketoxime, acyloxy, amide groups, and aminoxy, and a curing catalyst is added during preparation of said composition.

3. A method according to claim 2 where said polyorganosiloxane is a silanol- or dialkoxy-terminated polydiorganosiloxane, said curing catalyst is selected from the group consisting of dibutyltin dilaurate, dibutyltin dioctoate, dioctyltin dilaurate, dibutyltin malate ester, stannous octoate, tetrabutyl titanate, diisopropoxybis-(acetylacetone) titanium, and diisopropoxybis(ethyl acetoacetate)titanium, the concentration of said catalyst does not exceed 10 parts by weight per 100 parts of said polyorganosiloxane, and the ingredients added during preparation of said composition include an adhesion promoter.

* * * * *